United States Patent
Duncan

(10) Patent No.: US 6,976,499 B2
(45) Date of Patent: *Dec. 20, 2005

(54) TEAR-OUT COUPLING WITH CANTILEVERED PULL TAB

(75) Inventor: Scott Duncan, Anaheim, CA (US)

(73) Assignee: MCP Industries, Inc., Corona, CA (US)

(*) Notice: Subject to any disclaimer, the term of this patent is extended or adjusted under 35 U.S.C. 154(b) by 178 days.

This patent is subject to a terminal disclaimer.

(21) Appl. No.: 10/643,318

(22) Filed: Aug. 19, 2003

(65) Prior Publication Data

US 2004/0079409 A1 Apr. 29, 2004

Related U.S. Application Data

(63) Continuation of application No. 09/991,328, filed on Nov. 13, 2001, now Pat. No. 6,622,748.

(51) Int. Cl.$^7$ .......... F16K 17/40; G01M 3/04; F16L 55/11
(52) U.S. Cl. .......... 137/68.3; 137/68.27; 138/90; 251/294; 73/49.8
(58) Field of Search .......... 137/68.19, 68.27, 137/68.29, 68.3, 515; 138/89, 90; 73/40.5 R, 73/49.1, 49.8

(56) References Cited

U.S. PATENT DOCUMENTS

| | | | | |
|---|---|---|---|---|
| 4,936,350 A | * | 6/1990 | Huber | 138/90 |
| 6,267,001 B1 | * | 7/2001 | Duncan | 73/49.8 |
| 6,575,475 B1 | * | 6/2003 | Duncan | 277/607 |
| 6,588,454 B1 | * | 7/2003 | Johnson et al. | 138/90 |
| 6,595,242 B2 | * | 7/2003 | Duncan | 138/90 |
| 6,622,748 B2 | * | 9/2003 | Duncan | 137/68.3 |
| 6,755,215 B2 | * | 6/2004 | Duncan | 138/90 |

* cited by examiner

Primary Examiner—Ramesh Krishnamurthy
(74) Attorney, Agent, or Firm—John J. Connors; Connors & Assoc. Inc.

(57) ABSTRACT

A unitary removable barrier for installation in a cylindrical water line to selectively block the water line to passage of water therethrough. The unitary removable barrier is composed of a single piece body having at least one cylindrical section sized to receive upstream and downstream pipes of the water line. A planar disk is molded with the cylindrical section and is of a circular circumference which completely blocks the water line but which is selectively removable from the cylindrical section thus removing the barrier to the passage of water through the line. Removal of the barrier is facilitated through the use of a piercing device and pull tab which can be actuated from a position outside of the waste line.

20 Claims, 2 Drawing Sheets

TEAR-OUT COUPLING WITH CANTILEVERED PULL TAB

RELATED PATENT APPLICATIONS & INCORPORATION BY REFERENCE

This application is a continuation application of U.S. Ser. No. 09/991,328, filed Nov. 13, 2001, U.S. Pat. No. 6,622,748. This related application is incorporated herein by reference and made a part of this application. Moreover, the inventor incorporates herein by reference any and all U.S. patents, U.S. patent applications, and other documents cited or referred to in this application or cited or referred to in the U.S. patents and U.S. patent applications incorporated herein by reference.

TECHNICAL FIELD OF INVENTION

The present invention deals with a unitary removable barrier for installation in a cylindrical water line for temporarily blocking the passage of water through the line. When plumbing a structure such as a house intended to carry water, the structure goes through several waste line tests to confirm the integrity of the various plumbing joints. This requires temporarily blocking the waste line so that the water lines within the structure can be filled and leaks detected. The present invention involves an improved means of temporarily blocking the water waste line in order to create a suitable water head to conduct such testing.

BACKGROUND OF THE INVENTION

When plumbing a structure such as a house, the structure is subjected to at least two different waste water tests. A first test is intended to determine the integrity of the water lines at ground or slab by filling the structure's waste lines with water to create a pressure head. A second test is conducted at "top-out" meaning that after the structure is vented and tubs, sinks and other fixtures are installed, the waste lines are again filled with water to create yet another pressure head. Under pressure, the various lines are inspected for leakage prior to the installation of sheetrock which would obviously mask the detection of any leakage.

As background, plumbers are required to "stub out" or create an external waste line outlet two or three feet from the perimeter of the structural foundation. The "stub out" line is typically capped off in order to run the above-described water tests. There are a variety of currently available caps designed to accomplish this task. For example, a plumber may employ a rubber cap with a stainless steel bands. However, a rubber cap is prone to being blown off of the "stub out" if subjected to sufficient water head pressure. In order to prevent this from occurring, the plumber will oftentimes drive a wooden stake in front of the rubber cap. This entails a good deal of additional effort and is not particularly effective in preventing blow-off. As an alternative, a plumber. may glue the plastic test cap to the "stub out" which can be knocked off after the test has been conducted.

However, this requires applying and setting a suitable adhesive which obviously must later be removed once the test has been completed. At removal, the plumber is likely to get quite wet as the water head pressure is released. There are additional problems associated with caps employed at "stub out." For example, when a sewer line to the street or septic is about to be connected, the plumber is oftentimes not the party responsible for making the connection. If someone else makes the connection who is unfamiliar with this process, the cap will be cut off or otherwise removed releasing the water head within the structure perhaps prematurely before the plumber has had an opportunity to check the structure for leaks. Even if the plumber is the party responsible for connecting the sewer line to the "stub out," he may still be forced to release his test and then recap the line after the connection has been made thus requiring that the water head be reestablished. This is time-consuming and also is a waste of water. Ideally, the plumber would like to maintain a water head throughout the sheetrock process so that any accidental nailing into the waste line would be visible by observing water leakage.

In addition to the above, once the sewer has been connected, it is traditional for the plumber to return to the project to reset his waste lines at which point a plumber employs a wye, a one-eighth bend and a clean-out plug at the point where the sewer has been connected. A plumber typically employs a long test ball which is inserted into the one-eighth bend and wye and is inflated at the appropriate position. The test ball is intended to temporarily block the waste line to again create a suitable pressure head within the structure. However, these test balls are extremely expensive and by reducing pressure within the test ball, they can be removed and oftentimes stolen from the job site. Further, they can inadvertently lose air, slip down the line and cause a major stoppage which must be dealt with by excavating and exposing the sewer line. The air balls, which exhibit external ribs, crack after repeated usage and tend to leak under test. Leakage from the side wall of the test ball as well as from its air stem obviously results in water leakage to the sewer and reduction of water head thus reducing the effectiveness of the test.

One way of dealing with this issue has been disclosed in U.S. Pat. No. 5,507,501. The invention disclosed in the '501 patent is to employ a disk-shaped sealing device which is molded as an integral, unitary piece. The sealing device comprises a circular disc and an angled flange extending outwardly and upwardly from the perimeter of the circular disc. The disc-shaped device fits snugly within a barrel of a plastic fitting such that the circular disc is coaxially received in the barrel of the plastic fitting and the angled flange mates with and lies against a bevel in the barrel of the plastic fitting. A lug extends downwardly from the circular disc whereby first and second elongate grooves are formed in one of the surfaces of the disc. It is taught that the disc-shaped device can be ripped out of the barrel of the fitting so as to remove the device in its entirety from the fitting by pulling on the lug and ripping the circular disc along the first and second grooves in a spiral ripping motion that ultimately pulls the circular disc from the fitting.

Although the invention disclosed in the '501 patent constitutes a dramatic improvement over devices of the prior art described above, it, itself, is not without its limitations. Specifically, the disc-shaped sealing device must be employed only in a waste line which will accept an angled flange. As such, the device cannot be used when a water line is provided with a consistent and uniform interior diameter throughout its length. In addition, the disc-shaped sealing device must, itself, be sealed to the receiving ledge or flange of a waste line to ensure that the disc remains in sealing engagement with the water line during tests. This requires either the use of a glue or wax to ensure that the disc-shaped sealing device remains in place. It is hypothesized that these limitations have prevented the device described in the '501 patent from being universally accepted in the plumbing trade.

It is thus an object of the present invention to provide a means of temporarily blocking a "stub out" or water line which can effectively and temporarily prevent passage of water through the waste line thus creating a suitable pressure head within the structure while being easily removable from the waste line and while addressing all of the drawbacks recited above.

These objects will be more readily apparent when considering the following disclosure and appended drawings.

SUMMARY OF THE INVENTION

The present invention is directed to a unitary removable barrier for installation in a cylindrical water line to selectively block the water line to passage of water therethrough. The unitary removable barrier is composed of a single piece body having at least one cylindrical section having at least one cross-sectional area, longitudinal axis and sized to receive an upstream pipe and downstream pipe of the water line. A planar disk is located within said at least one cylindrical section and which is characterized as being of circular circumference with completely blocks the cross-sectional area and having a diameter which is substantially perpendicular to the recited longitudinal axis. The planar disk is selectively removable from the cylindrical section thus removing the barrier to the water line. Removal of the planar disk is facilitated by providing at least one score line as well as a piercing assembly comprising a piercing tab having a flat portion for residing on a first side of the planar disk and a cantilevered portion terminating at a pointed end, the pointed end residing along the score line. On the other side of the planar disk is provided a pull tab and a pull line connected to the pull tab for removal of the barrier.

DETAILED DESCRIPTION OF THE INVENTION

Figure 1:
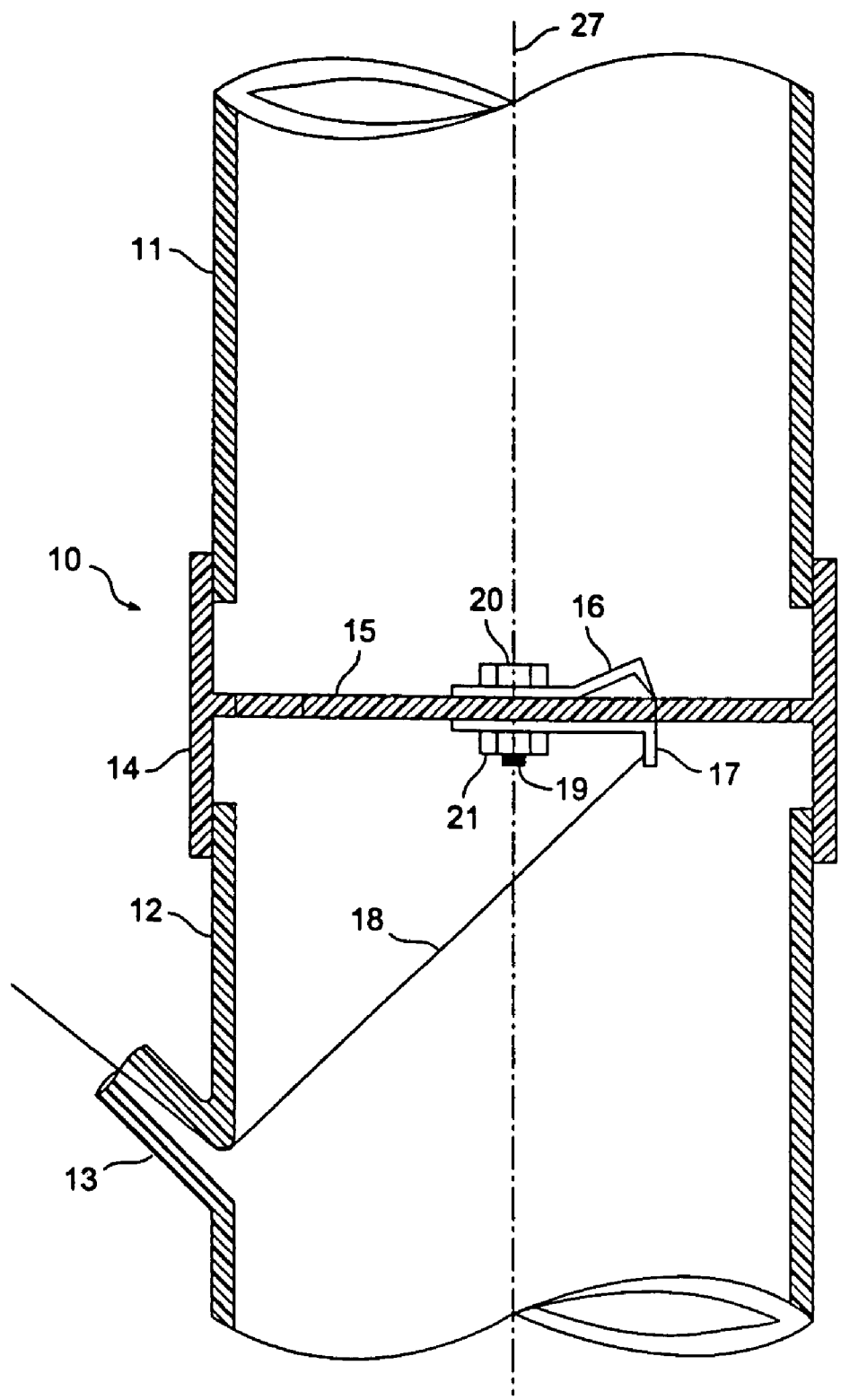
FIG. 1 is a cross-sectional view of the present invention installed within a water waste line.

Turning first to FIG. 1, the present unitary removable barrier 10 is shown installed in a cylindrical water line having upstream cylindrical pipe 11 and downstream cylindrical pipe 12 which are preferably frictionally fit within cylindrical section 14 of unitary removable barrier 10. As such, as waste water proceeds within cylindrical pipe 11, it is prevented from passing through the line to a municipal sewer system or similar collector by virtue of planar disk 15.

Preferably, the unitary removable barrier 10 is composed of a single body such as a plastic or rubber composite molded or otherwise configured as having at least one cylindrical section 14 having at least one cross-sectional area, longitudinal axis 27 which, as noted above, is sized to receive upstream pipe 11 and downstream pipe 12, preferably as a friction fit. Planar disk 15 is located within said at least one cylindrical section 14 and which is characterized as being of circular circumference which completely blocks the recited cross-sectional area.

Further, as shown in FIG. 1, the planar disk is provided with a diameter which is substantially perpendicular to longitudinal axis 27.

The present invention is intended to selectively block the water line created by cylindrical pipes 11 and 12. Blockage is removed by removing planar disk 15.

Figure 3:
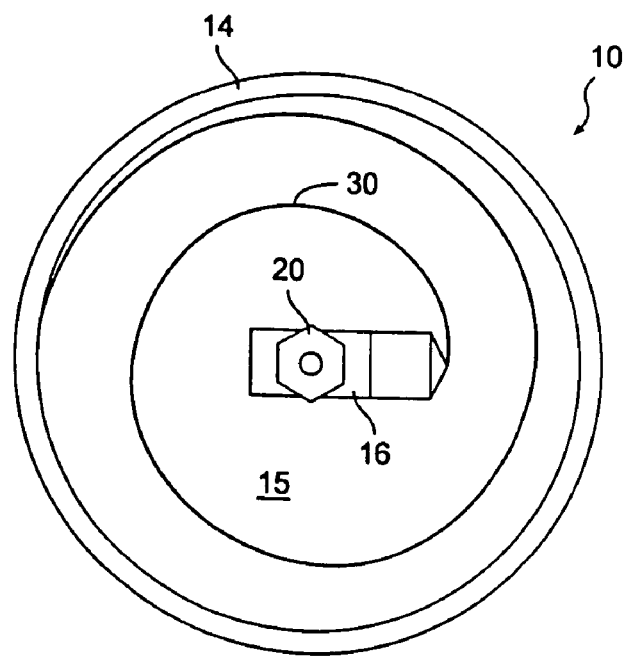
FIG. 3 is a top plan view of the device of the present invention.

The removal of planar disk 15 is facilitated through the use of score line 30 (FIG. 3) created therein. Specifically, the planar disk 15 is provided with a predetermined thickness and composition, be it plastic or rubber, to prevent anticipated water pressure from inadvertently rupturing planar disk 15. However, when a suitable water test is completed and planar disk 15 is no longer required, planar disk 15 is scored through score line 30 to encourage its removal. As noted in FIG. 3, score line 30 can either emanate helically from a position proximate the geometric center of planar disk 15 or, alternatively, score line 30 can simply traverse the circumference of planar disk 15. In either case, an appropriate piercing device is introduced in order to, again, facilitate removal.

Figure 2A:
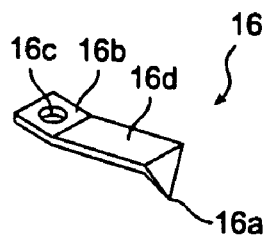
FIGS. 2A and 2B are perspective views of a piercing device and pull tab, respectively, for use herein.
Figure 2B:
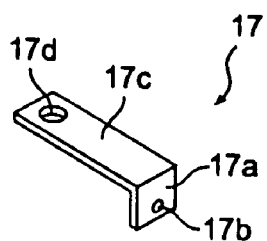

Piercing device 16 is provided on a first or upstream side of planar disk 15 and is provided with flat portion 16B which resides against planar disk 15 and cantilevered portion 16D, terminating at pointed end 16A. On the second or downstream side of planar disk 15 is provided pull tab 17 consisting of flat portion 17C which ideally is seated flush against the second side of planar disk 15 and tab portion 17A emanating away from planar disk 15. Piercing device 16 and pull tab device 17 can be connected to one another through planar disk 15 by using bolt 19 having head 20 which is screwably engaged with nut 21. As shown in FIGS. 1, 2A and 2B, bolt 19 is caused to pass through opening 16C and 17D to complete the appropriate attachment.

In selectively removing planar disk 15 from the water line, a pull line in the form of rope, thread, wire, or synthetic monofilament can, at one end, be appended to eyelet 17B while its second end extends through pipe wye or tee 13 so that pull tab 17 can be moved from a position outside of the waste line.

In use, pull line 18 can be drawn from a position outside of the waste line, thus creating a moment arm through pull tab's body portion 17C. Through the coupling of pull tab 17 with piercing device 16 through bolt 19, once the pull tab is drawn, pointed end 16A is caused to pierce score line 30 thus compromising the integrity of planar disk 15. As pull line 18 continues to be drawn from wye or tee 13, planar disk 15 continues to unravel along score line 30 until its complete removal has been achieved. As a preferred embodiment, as pull line 18 continues to be drawn upon, the entire planar disk 15 assembly including piercing device 16, pull tab 17 and the related connecting hardware (e.g., bolt 19 and nut 21) can be pulled through wye or tee 13 thus removing this now unwanted assembly completely from the waste line.

What is claimed is:

1. A barrier used during testing of a water line including an upstream pipe and a downstream pipe, said barrier comprising
   a cylindrical wall, and
   a selectively removable planar disk disposed within the wall member substantially at a right angle to the cylindrical wall,
   said planar disk forming within the wall member on opposite sides of said planar disk a first section sized to receive the upstream pipe and a second section sized to receive the downstream pipe,
   said planar disk having attached thereto a piercing assembly including
   a piercing member having a pointed end, said piercing member mounted to planar disk to be pulled towards the planar disk to pierce said planar disk, and a pull line connected to the piercing assembly to enable a user while the barrier is installed in a water line to pull the piercing member towards the planar disk and pierce said planar disk.

2. The barrier of claim 1 where the planar disk includes a score line.

3. The barrier of claim 2 where the pointed end of the piercing member resides along the score line.

4. The barrier of claim 2 where the score line emanates helically from a position proximate the geometric center of the planar disk.

5. The barrier of claim 2 where the score line substantially traverses the circumference of the disk.

6. The barrier of claim 1 where the piercing member is on one side of the planar disk and a pull member is on the other side of the planar disk, said pull line being connected to the pull member.

7. The barrier of claim 6 where the piercing member has a flat portion residing on said one side of the planar disk and a cantilevered portion terminating in said pointed end.

8. The barrier of claim 1 where the cylindrical wall and planar disk are a single piece body molded as a unitary structure and made of a rubber or plastic.

9. A barrier used during testing of a water line including an upstream pipe and a downstream pipe, each pipe having a predetermined circumferential configuration, said barrier comprising
   a single piece body molded as a unitary structure including
      an upstream wall section having an internal circumferential configuration substantially the same as the circumferential configuration of the upstream pipe and sized to receive the upstream pipe,
      a downstream wall section having an internal circumferential configuration substantially the same as the circumferential configuration of the downstream pipe and sized to receive the downstream pipe,
      a selectively removable disk disposed between the upstream wall section and the downstream wall section to block the flow of water between the wall sections,
      said planar disk having attached thereto a piercing assembly including
         a piercing member having a pointed end, said piercing member mounted to planar disk to be pulled towards the planar disk to pierce said planar disk, and
         a pull line connected to the piercing assembly to enable a user while the barrier is installed in a water line to pull the piercing member towards the planar disk and pierce said planar disk.

10. The barrier of claim 9 where the planar disk includes a score line.

11. The barrier of claim 10 where the pointed end of the piercing member resides along the score line.

12. The barrier of claim 10 where the score line emanates helically from a position proximate the geometric center of the planar disk.

13. The barrier of claim 10 where the score line substantially traverses the circumference of the disk.

14. The barrier of claim 10 where the piercing member is on one side of the planar disk and a pull member is on the other side of the planar disk, said pull line being connected to the pull member.

15. The barrier of claim 14 where the piercing member has a flat portion residing on said one side of the planar disk and a cantilevered portion terminating in said pointed end.

16. A barrier used during testing of a water line including an upstream pipe and a downstream pipe, each pipe having a predetermined circumferential configuration, said barrier comprising
   a body including
      an upstream wall section having an internal circumferential configuration substantially the same as the circumferential configuration of the upstream pipe and sized to receive the upstream pipe,
      a downstream wall section having an internal circumferential configuration substantially the same as the circumferential configuration of the downstream pipe and sized to receive the downstream pipe,
      a selectively removable disk disposed between the upstream wall section and the downstream wall section to block the flow of water between the wall sections,
      said planar disk including a score line and having attached thereto a piercing assembly including
         a piercing member having a pointed end residing along the score line and mounted on one side to planar disk to be pulled towards the planar disk to pierce said planar disk,
         a pull member is on the other side of the planar disk, and
         a pull line connected to the pull member to enable a user while the barrier is installed in a water line to pull the piercing member towards the planar disk and pierce said planar disk.

17. The barrier of claim 16 where the score line emanates helically from a position proximate the geometric center of the planar disk.

18. The barrier of claim 16 where the score line substantially traverses the circumference of the disk.

19. The barrier of claim 16 where the piercing member has a flat portion residing on said one side of the planar disk and a cantilevered portion terminating in said pointed end.

20. A water line comprising
   an upstream pipe and a downstream pipe connected together by a single piece body test barrier molded as a unitary structure, each pipe having a predetermined circumferential configuration, said barrier comprising
   a single piece body molded as a unitary structure including
      an upstream wall section having an internal circumferential configuration substantially the same as the circumferential configuration of the upstream pipe and the upstream pipe received therein,
      a downstream wall section having an internal circumferential configuration substantially the same as the circumferential configuration of the downstream pipe and the downstream pipe received therein,
      a selectively removable disk disposed between the upstream wall section and the downstream wall section to block the flow of water between the wall sections,
      said planar disk having attached thereto a piercing assembly including
         a piercing member having a pointed end, said piercing member mounted to planar disk to be pulled towards the planar disk to pierce said planar disk, and
         a pull line connected to the piercing assembly to enable a user while the barrier is installed in a water line to pull the piercing member towards the planar disk and pierce said planar disk.

* * * * *